(12) United States Patent
Wei et al.

(10) Patent No.: US 12,210,472 B2
(45) Date of Patent: Jan. 28, 2025

(54) ELECTRICAL SIGNAL TRANSMISSION METHOD, ELECTRICAL SIGNAL TRANSMISSION CONTROL CHIP, AND ELECTRICAL SIGNAL TRANSMISSION SYSTEM

(71) Applicants: K-Tronics (Suzhou) Technology Co., Ltd., Jiangsu (CN); BOE TECHNOLOGY GROUP CO., LTD., Beijing (CN)

(72) Inventors: Hao Wei, Beijing (CN); Huiling Zang, Beijing (CN); Xiandong Cheng, Beijing (CN); Xiaoping Wang, Beijing (CN); Luyang Xiang, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/908,380

(22) PCT Filed: Jul. 12, 2021

(86) PCT No.: PCT/CN2021/105790
§ 371 (c)(1),
(2) Date: Aug. 31, 2022

(87) PCT Pub. No.: WO2023/283770
PCT Pub. Date: Jan. 19, 2023

(65) Prior Publication Data
US 2024/0193115 A1 Jun. 13, 2024

(51) Int. Cl.
*G06F 13/40* (2006.01)
*G09G 3/32* (2016.01)
*H04L 12/10* (2006.01)

(52) U.S. Cl.
CPC .......... *G06F 13/4004* (2013.01); *H04L 12/10* (2013.01); *G09G 3/32* (2013.01);
(Continued)

(58) Field of Classification Search
None
See application file for complete search history.

(56) References Cited

U.S. PATENT DOCUMENTS

2004/0230846 A1* 11/2004 Mancey .................. H04L 12/10
713/300
2005/0243861 A1* 11/2005 Elkayam ................. H04L 12/10
713/300

(Continued)

*Primary Examiner* — Farley Abad
*Assistant Examiner* — Dayton Lewis-Taylor
(74) *Attorney, Agent, or Firm* — IP & T GROUP LLP

(57) ABSTRACT

An electrical signal transmission method applied to an electrical signal transmission system includes first transmission interfaces and second transmission interface(s). Electrical signal transmission modes of the electrical signal transmission system include: a first transmission mode used for controlling a total transmission power of the first transmission interfaces and the second transmission interface(s) to be less than or equal to a first preset power, and a second transmission mode used for controlling a maximum transmission power of a second transmission interface to be the first preset power. The electrical signal transmission method includes: determining whether the first transmission mode is turned on; if yes, making the total transmission power of the first transmission interfaces and the second transmission interface(s) less than or equal to the first preset power; and if no, making the maximum transmission power of the second transmission interface be a second preset power.

18 Claims, 5 Drawing Sheets

(52) U.S. Cl.
CPC .. *G09G 2320/041* (2013.01); *G09G 2330/021* (2013.01); *G09G 2370/00* (2013.01)

(56) References Cited

U.S. PATENT DOCUMENTS

2016/0352101 A1* 12/2016 Koo .......................... H02J 1/12
2017/0177069 A1*  6/2017 Bedare .................... G06F 1/263

* cited by examiner

ELECTRICAL SIGNAL TRANSMISSION METHOD, ELECTRICAL SIGNAL TRANSMISSION CONTROL CHIP, AND ELECTRICAL SIGNAL TRANSMISSION SYSTEM

CROSS-REFERENCE TO RELATED APPLICATION

This application is a national phase entry under 35 USC 371 of International Patent Application No. PCT/CN2021/105790 filed on Jul. 12, 2021, which is incorporated herein by reference in its entirety.

TECHNICAL FIELD

The present disclosure relates to the field of display technologies, and in particular, to an electrical signal transmission method, an electrical signal transmission control chip, an electrical signal transmission system, a computer program product and a computer program.

BACKGROUND

A display device includes interfaces. For example, the display device includes a plurality of video interfaces and a plurality of transmission interfaces. The plurality of transmission interfaces include various types of transmission interfaces. In a case where the plurality of transmission interfaces are connected to external devices and a power of a power supply of the display device is certain, it is a big challenge to realize simultaneous transmission of the transmission interfaces and enable each transmission interface to perform transmission with a relatively high power.

SUMMARY

In an aspect, an electrical signal transmission method is provided. The electrical signal transmission method is applied to an electrical signal transmission system, the electrical signal transmission system includes at least two first transmission interfaces and at least one second transmission interface. Electrical signal transmission modes of the electrical signal transmission system include a first transmission mode and a second transmission mode; the first transmission mode is used for controlling a total transmission power of the at least two first transmission interfaces and the at least one second transmission interface to be less than or equal to a first preset power; and the second transmission mode is used for controlling a maximum transmission power of a second transmission interface in the at least one second transmission interface to be the first preset power.

The electrical signal transmission method includes: determining whether the second transmission mode is turned on; if the second transmission mode is turned on, disabling a function of the first transmission mode, and making the maximum transmission power of the second transmission interface be the first preset power in response to an instruction of turning on the second transmission mode; and if the second transmission mode is not turned on, determining whether the first transmission mode is turned on;

if the first transmission mode is turned on, making the total transmission power of the at least two first transmission interfaces and the at least one second transmission interface less than or equal to the first preset power in response to an instruction of turning on the first transmission mode; and if the first transmission mode is not turned on, making the maximum transmission power of the second transmission interface be a second preset power.

In some embodiments, making the total transmission power of the at least two first transmission interfaces and the at least one second transmission interface less than or equal to the first preset power in response to the instruction of turning on the first transmission mode, includes: reading a real-time total power of the at least two first transmission interfaces in real time in a process where the at least two first transmission interfaces transmit electrical signals; calculating a transmission power of the at least one second transmission interface according to the real-time total power and the first preset power; and controlling the at least one second transmission interface to transmit an electrical signal in real time according to the calculated transmission power of the at least one second transmission interface.

In some embodiments, the second preset power is less than the first preset power.

In some embodiments, one first transmission interface in the at least two first transmission interfaces is a fast transmission interface, and at least one remaining first transmission interface in the at least two first transmission interfaces is at least one common transmission interface. The electrical signal transmission modes of the electrical signal transmission system further include a third transmission mode, and the third transmission mode is used for controlling a fast transmission function of the fast transmission interface to be turned on. The electrical signal transmission method further includes: if the second transmission mode is not turned on, determining whether the third transmission mode is turned on while determining whether the first transmission mode is turned on; if the third transmission mode is turned on, in response to an instruction of turning on the third transmission mode, making a maximum transmission power of the fast transmission interface in the at least two first transmission interfaces be a third preset power, and making a maximum transmission power of a common transmission interface in the at least one common transmission interface be a fourth preset power; and if the third transmission mode is not turned on, making a maximum transmission power of each of the at least two first transmission interfaces be the fourth preset power. The third preset power is greater than the fourth preset power.

In some embodiments, the electrical signal transmission method further includes: determining whether a total power consumption of the at least two first transmission interfaces exceeds a set power consumption before determining whether the second transmission mode is turned on; if the total power consumption of the at least two first transmission interfaces exceeds the set power consumption, disabling a function of the second transmission mode, and turning on the function of the first transmission mode; and in response to the instruction of turning on the first transmission mode, making the total transmission power of the at least two first transmission interfaces and the at least one second transmission interface less than or equal to the first preset power; and if the total power consumption of the at least two first transmission interfaces does not exceed the set power consumption, determining whether the second transmission mode is turned on.

In some embodiments, the electrical signal transmission method further includes: determining whether the second transmission interface is connected to a second transmission line before determining whether the total power consumption of the at least two first transmission interfaces exceeds the set power consumption; if the second transmission interface is connected to the second transmission line, enabling the function of the first transmission mode, the function of the second transmission mode and a function of the third transmission mode, and determining whether the total power consumption of the at least two first transmission interfaces exceeds the set power consumption; and if the second transmission interface is not connected to the second transmission line, disabling the function of the first transmission mode and the function of the second transmission mode, and enabling the function of the third transmission mode.

In some embodiments, the electrical signal transmission method further includes: if the second transmission interface is connected to the second transmission line, determining whether the second transmission line supports a fast transmission mode; if the second transmission line supports the fast transmission mode, enabling the function of the first transmission mode, the function of the second transmission mode and the function of the third transmission mode, and determining whether the total power consumption of the at least two first transmission interfaces exceeds the set power consumption; and if the second transmission line does not support the fast transmission mode, enabling the function of the first transmission mode, the function of the second transmission mode and the function of the third transmission mode, and making the maximum transmission power of the second transmission interface be a fifth transmission power. The fifth transmission power is less than the second preset power.

In another aspect, an electrical signal transmission control chip is provided. The electrical signal transmission control chip is applied to an electrical signal transmission system, the electrical signal transmission system includes at least two first transmission interfaces and at least one second transmission interface. Electrical signal transmission modes of the electrical signal transmission system include a first transmission mode and a second transmission mode; the first transmission mode is used for controlling a total transmission power of the at least two first transmission interfaces and the at least one second transmission interface to be less than or equal to a first preset power; and the second transmission mode is used for controlling a maximum transmission power of a second transmission interface in the at least one second transmission interface to be the first preset power.

The electrical signal transmission control chip includes a control circuit and a determination circuit. The determination circuit is configured to determine whether the second transmission mode is turned on, and transmit a determination result to the control circuit. The control circuit is configured to: if the determination result is that the second transmission mode is turned on, disable a function of the first transmission mode and make the maximum transmission power of the second transmission interface be the first preset power in response to an instruction of turning on the second transmission mode; if the determination result is that the second transmission mode is not turned on, feed back the determination result to the determination circuit.

The determination circuit is further configured to: if the second transmission mode is not turned on, determine whether the first transmission mode is turned on, and transmit another determination result to the control circuit. The control circuit is further configured to: if the determination result is that the first transmission mode is turned on, make the total transmission power of the at least two first transmission interfaces and the at least one second transmission interface less than or equal to the first preset power in response to an instruction of turning on the first transmission mode; if the determination result is that the first transmission mode is not turned on, make the maximum transmission power of the second transmission interface be a second preset power. The second preset power is less than the first preset power.

In some embodiments, one first transmission interface in the at least two first transmission interfaces is a fast transmission interface, and at least one remaining first transmission interface in the at least two first transmission interfaces is at least one common transmission interface. The electrical signal transmission modes of the electrical signal transmission system further include a third transmission mode, and the third transmission mode is used for controlling a fast transmission function of the fast transmission interface to be turned on. The determination circuit is further configured to, if the second transmission mode is not turned on, determine whether the third transmission mode is turned on while determining whether the first transmission mode is turned on, and transmit yet another determination result to the control circuit. The control circuit is further configured to: if the determination result is that the third transmission mode is turned on, in response to an instruction of turning on the third transmission mode, make a maximum transmission power of the fast transmission interface in the at least two first transmission interfaces be a third preset power, and make a maximum transmission power of a common transmission interface in the at least one common transmission interface be a fourth preset power; and if the determination result is that the third transmission mode is not turned on, make a maximum transmission power of each of the at least two first transmission interfaces be the fourth preset power. The third preset power is greater than the fourth preset power.

In some embodiments, the determination circuit is further configured to determine whether a total power consumption of the at least two first transmission interfaces exceeds a set power consumption before determining whether the second transmission mode is turned on, and transmit yet another determination result to the control circuit. The control circuit is further configured to: if the determination result is that the total power consumption of the at least two first transmission interfaces exceeds the set power consumption, disable a function of the second transmission mode, and turn on the function of the first transmission mode; and in response to the instruction of turning on the first transmission mode, make the total transmission power of the at least two first transmission interfaces and the at least one second transmission interface less than or equal to the first preset power; and if the determination result is that the total power consumption of the at least two first transmission interfaces does not exceed the set power consumption, feed back the determination result to the determination circuit.

In some embodiments, the determination circuit is further configured to: determine whether the second transmission interface is connected to a second transmission line before determining whether the total power consumption of the at least two first transmission interfaces exceeds the set power consumption. The control circuit is further configured to: if the determination result is that the second transmission interface is connected to the second transmission line, enable the function of the first transmission mode, the function of the second transmission mode and a function of the third transmission mode, and determine whether the total power consumption of the at least two first transmission interfaces exceeds the set power consumption, and if the determination result is that the second transmission interface is not connected to the second transmission line, disable the function of the first transmission mode and the function of the second transmission mode, and enable the function of the third transmission mode.

In yet another aspect, an electrical signal transmission system is provided. The electrical signal transmission system includes: the electrical signal transmission control chip according to any one of the embodiments in the above aspect, at least two first transmission interfaces and at least one second transmission interface. The at least two first transmission interfaces are coupled to the electrical signal transmission control chip, and are configured to be coupled to first transmission lines to perform electrical signal transmission. The at least one second transmission interface is coupled to the electrical signal transmission control chip, and is configured to be coupled to at least one second transmission line to perform electrical signal transmission. The at least two first transmission interfaces and the at least one second transmission interface each transmit an electrical signal with a preset power under control of the electrical signal transmission control chip.

In some embodiments, the electrical signal transmission system further includes: a first power monitor, a second power monitor and a first power controller. The first power monitor is coupled to the at least two first transmission interfaces, and is configured to monitor a real-time total transmission power of the at least two first transmission interfaces, and output a first monitoring result. The second power monitor is coupled to the second transmission interface, and is configured to monitor a real-time transmission power of the second transmission interface, and output a second monitoring result. The first power controller is coupled to the electrical signal transmission control chip, the first power monitor, the second power monitor and the second transmission interface, and the first power controller is configured to receive the first monitoring result and the second monitoring result, transmit the first monitoring result and the second monitoring result to the electrical signal transmission control chip, and control a transmission power of the second transmission interface under control of the electrical signal transmission control chip.

In some embodiments, the electrical signal transmission system further includes a second power controller coupled to the electrical signal transmission control chip and the at least two first transmission interfaces. The second power controller is configured to control transmission powers of the at least two first transmission interfaces under the control of the electrical signal transmission control chip.

In yet another aspect, a non-transitory computer-readable storage medium is provided, the computer-readable storage medium stores computer program instructions that, when run on a processor, cause the processor to perform one or more steps of the electrical signal transmission method as described in any one of the above embodiments.

In yet another aspect, a computer program product is provided. The computer program product includes computer program instructions that, when executed on a computer, cause the computer to perform one or more steps of the electrical signal transmission method as described in any one of the above embodiments.

In yet another aspect, a computer program is provided. When the computer program is executed on a computer, the computer program causes the computer to perform one or more steps of the electrical signal transmission method as described in any one of the above embodiments.

In some embodiments, the electrical signal transmission system further includes: a power interface, a first power distributor and a second power distributor. The power interface is configured to connect to an external power supply and transmit power to an inside of the electrical signal transmission system. The first power distributor is coupled to the power interface and the at least two first transmission interfaces, and the first power distributor is configured to distribute corresponding voltages and currents to the at least two first transmission interfaces according to a received power. The second power distributor is coupled to the power interface and the at least one second transmission interface, and the second power distributor is configured to distribute a corresponding voltage and current to the at least one second transmission interface according to another received power.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these accompanying drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
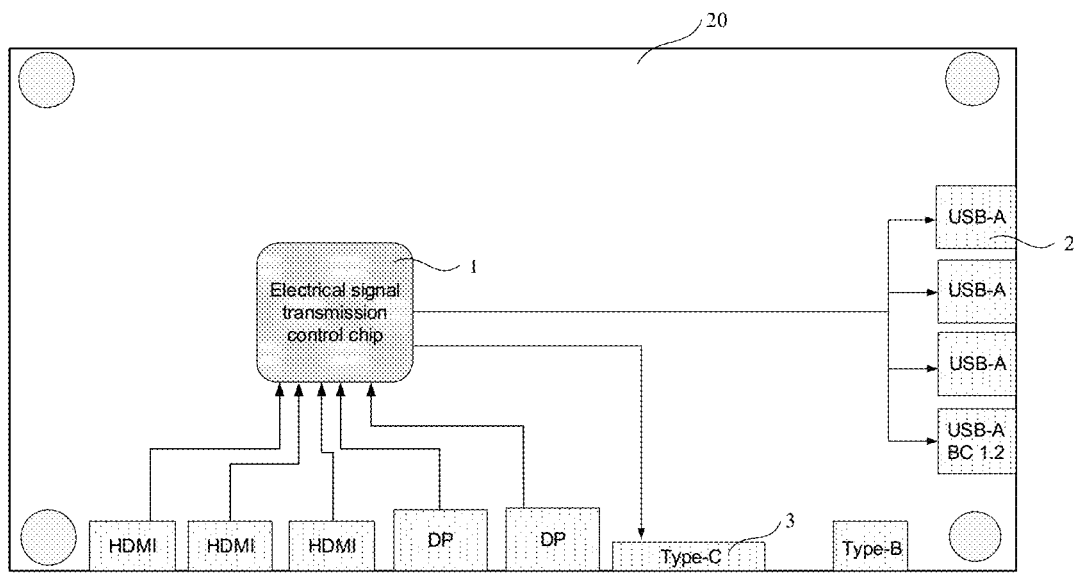
FIG. 1 is a structural diagram of a display device, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the term such as "one embodiment", "some embodiments", "exemplary embodiments", "example", "specific example"

or "some examples" is intended to indicate that specific features, structures, materials or characteristics related to the embodiment(s) or example(s) are included in at least one embodiment or example of the present disclosure. Schematic representation of the above term does not necessarily refer to the same embodiment(s) or examples(s). In addition, the specific features, structures, materials, or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with the term "first" or "second" may explicitly or implicitly include one or more of the features. In the description of the embodiments of the present disclosure, the term "a plurality of", "the plurality of" and "multiple" each mean two or more unless otherwise specified.

In the description of some embodiments, the terms "coupled" and "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. The term "coupled" or "communicatively coupled" may also mean that two or more components are not in direct contact with each other, but still cooperate or interact with each other. The embodiments disclosed herein are not necessarily limited to the context herein.

As used herein, depending on the context, the term "if" is optionally construed as "when" or "in a case where" or "in response to determining" or "in response to detecting". Similarly, depending on the context, the phrase "if it is determined . . . " or "if [a stated condition or event] is detected" is optionally construed as "in a case where it is determined . . . " or "in response to determining . . . " or "in a case where [the stated condition or event] is detected" or "in response to detecting [the stated condition or event]".

The phrase "applicable to" or "configured to" used herein means an open and inclusive expression, which does not exclude devices that are applicable to or configured to perform additional tasks or steps.

In addition, the phrase "based on" is meant to be open and inclusive, since a process, a step, a calculation or other action that is "based on" one or more of the stated conditions or values may, in practice, be based on additional conditions or values exceeding those stated.

A display device includes multiple interfaces, such as video interfaces and transmission interfaces. As shown in FIG. 1, in an example of a mini light-emitting diode (Mini LED) display device 200, the display device 200 includes high definition multimedia interfaces (HDMIs), display ports (DPs), a type-C interface, a type-B interface and type-A interfaces (USB-A interfaces). The HDMIs and the DPs each are used to transmit a video signal to enable the display device to perform display, and the type-C interface and the type-A interfaces each are used for transmission with an external device.

The display device generally has a high power consumption and generates more heat during operation, which leads to an increase in temperature and affects normal operation of devices in the display device. Thus, in a condition of rising temperature, it is a great challenge to realize simultaneous transmission of the type-C interface and the type-A interface, and enable the type-C interface and the type-A interface to perform transmission with an appropriate transmission power according to customer's requirements. In the related art, a power of a power supply of the display device is increased to meet a maximum transmission power of the type-C interface and the type-A interface. However, it will cause an excessive energy consumption, and generate excessive heat, which affects the normal operation of the display device.

In light of this, some embodiments of the present disclosure provide an electrical signal transmission system 100, an electrical signal transmission control chip 1 and a transmission method. The electrical signal transmission system 100 may be applied to an electronic device (e.g., the display device 200), and the electrical signal transmission system 100 includes the electrical signal transmission control chip 1. The transmission method is applied to the electrical signal transmission system 100.

Figure 2:
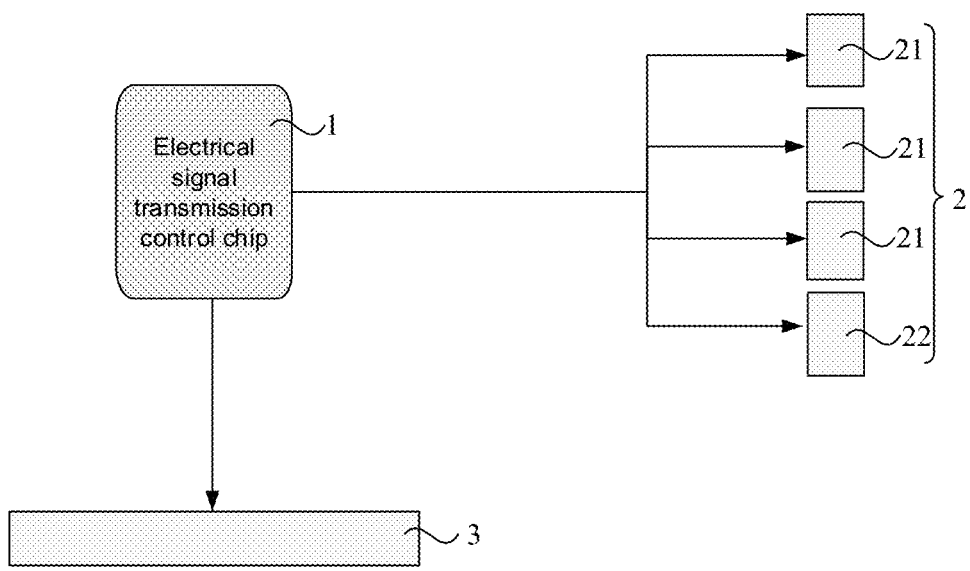
FIG. 2 is a structural diagram of an electrical signal transmission system, in accordance with some embodiments.

As shown in FIG. 2, in some embodiments, the electrical signal transmission system 100 includes the electrical signal transmission control chip 1, at least two first transmission interfaces 2 and at least one second transmission interface 3, the at least two first transmission interfaces 2 are coupled to the electrical signal transmission control chip 1, and each are configured to be coupled to a first transmission line for transmission. For example, an external device connected to the first transmission interface 2 through the first transmission line is a mouse, a keyboard, a mobile phone, or the like. The second transmission interface(s) 3 are coupled to the electrical signal transmission control chip 1, and each are configured to be coupled to a second transmission line for transmission. For example, an external device connected to the second transmission interface 3 through the second transmission line is, for example, a personal computer. The at least two first transmission interfaces 2 and the at least one second transmission interface 3 each transmit with a preset power under control of the electrical signal transmission control chip 1.

Figure 3:
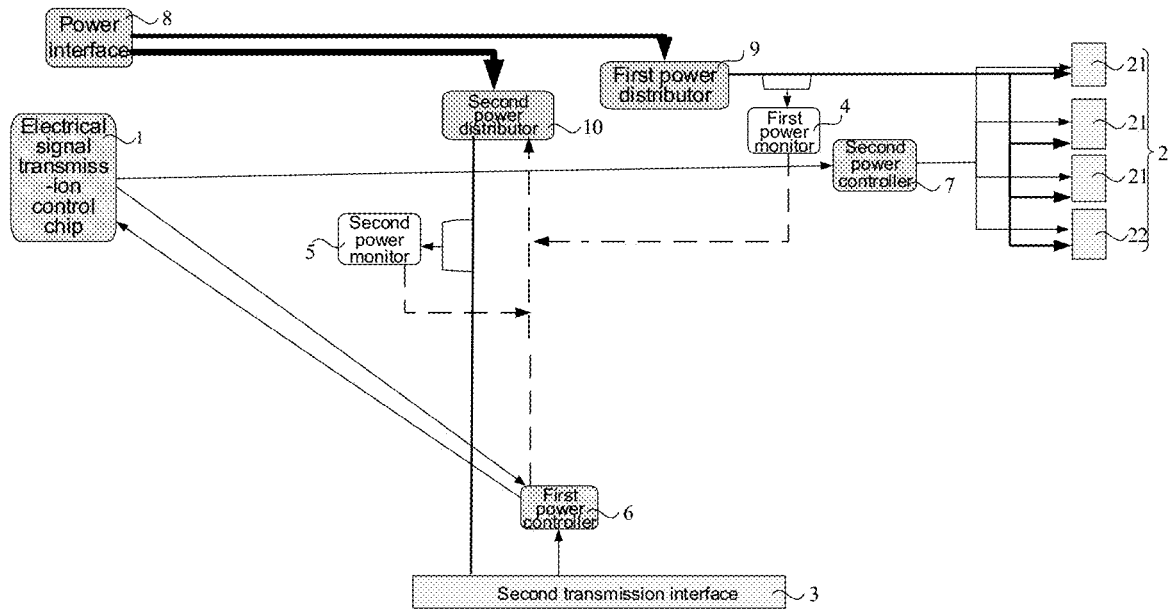
FIG. 3 is a structural diagram of another electrical signal transmission system, in accordance with some embodiments.

For example, the electrical signal transmission system 100 is applied to the display device. As shown in FIG. 1, the display device 200 includes a display main board 20. The electrical signal transmission control chip 1, the at least two first transmission interfaces 2 and the at least one second transmission interface 3 are arranged on the display main board 20. Referring to FIG. 3, the electrical signal transmission system 100 further includes a power interface 8.

In some embodiments, the first transmission interface 2 and the second transmission interface 3 each may transmit an electrical signal. For example, the first transmission interface 2 and the second transmission interface 3 each may perform power transmission, so as to charge an external device; or the first transmission interface 2 and the second transmission interface 3 each may transmit a data signal, a video signal, etc. For example, in the case where the external device connected to the second transmission interface 3 is the personal computer, the second transmission interface 3 may transmit the video signal input from the personal computer, so that the display device displays an image.

As shown in FIG. 2, the electrical signal transmission system 100 includes, for example, four first transmission interfaces 2 and one second transmission interface 3. For example, the first transmission interface 2 is the type-A interface, and the first transmission line is a type-A line. For example, the second transmission interface 3 is the type-C interface, and the second transmission line is a type-C line. One first transmission interface 2 in the at least two first transmission interfaces 2 is a fast transmission interface 22, and remaining first transmission interface(s) 2 in the at least two first transmission interfaces 2 are common transmission interface(s) 21. For example, one of the four first transmission interfaces 2 is the fast transmission interface 22. The fast transmission interface is, for example, a type-A interface of USB 3.0, and a maximum transmission power of the fast transmission interface 22 is 5 V/2.5 A. In a case where a third transmission mode is turned on (the third transmission mode controlling turn-on and turn-off of a fast transmission function of the fast transmission interface 22), the fast transmission function based on the battery charging v1.2 (BC 1.2) may be achieved; and in a case where the third transmission mode is turned off, the fast transmission function of the fast transmission interface 22 cannot be achieved, and the maximum transmission power of the fast transmission interface 22 is consistent with a maximum transmission power of the common transmission interface 21. Remaining three first transmission interfaces 2 are the common transmission interfaces 21, and the maximum transmission power of the common transmission interface 21 is 5 V/0.9 A. The second transmission interface 3 (i.e., the type-C interface) supports high-current and high-voltage transmission. On a premise that the second transmission line connected to the second transmission interface 3 supports a fast transmission mode, e.g., power delivery 3.0, 5 A (PD 3.0, 5 A), the type-C interface may perform transmission with a large power (e.g., 90 W); otherwise, the maximum transmission power of the type-C interface has an upper limit, e.g., 60 W (20 V/3 A).

Three transmission modes are involved in the electrical signal transmission method provided in some embodiments of the present disclosure. That is, the electrical signal transmission system has three electrical signal transmission modes, which are a first transmission mode, a second transmission mode and the third transmission mode. The first transmission mode is that, in a case where the at least two first transmission interfaces 2 and the second transmission interface(s) 3 are used simultaneously, a total transmission power of the at least two first transmission interfaces 2 and the second transmission interface(s) 3 is less than or equal to a first preset power. It can be understood that, in a case where the total transmission power of the at least two first transmission interfaces 2 and the second transmission interface(s) 3 does not exceed the first preset power, on a basis of maintaining the first preset power, the system reasonably configures a transmission power of the second transmission interface 3 according to a transmission power of the at least two first transmission interfaces 2. For example, the first preset power is a maximum output power of the electrical signal transmission system 100 for transmission. The first preset power is, for example, 100 W.

It will be noted that, a case where the at least two first transmission interfaces 2 are used includes that all the first transmission interfaces 2 are connected to the external devices and are used. Alternatively, the case where the at least two first transmission interfaces 2 are used includes that some of the at least two first transmission interfaces 2 are used. For example, two of the four first transmission interfaces 2 are connected to the external devices for transmission.

The second transmission mode is used for controlling a fast transmission function of the second transmission interface 3 to be turned on or off. The second transmission interface 3 is the type-C interface, which support the high-current and high-voltage transmission. In a case where the second transmission mode is turned on, the second transmission interface 3 is capable of performing transmission with the external device at a full load. For example, a maximum transmission power of the second transmission interface 3 may reach the first preset power (100 W). In a case where the second transmission mode is turned off, the transmission power of the second transmission interface 3 depends on different situations.

It can be understood that the first transmission mode and the second transmission mode may not be turned on simultaneously.

The third transmission mode is used for controlling the fast transmission function of the fast transmission interface 22 in the at least two first transmission interfaces 2 to be turned on and off. In an example where the electrical signal transmission system 100 includes four first transmission interfaces 2 and one of the four first transmission interfaces 2 is the fast transmission interface 22, in a case where the third transmission mode is turned on, the fast transmission function of the fast transmission interface 22 in the four first transmission interfaces 2 is turned on, the fast transmission interface 22 transmits with a maximum transmission power as a third preset power, and remaining three common transmission interfaces 21 each transmit with a maximum transmission power as a fourth preset power. The third preset power is greater than the fourth preset power. For example, the third preset power is 12.5 W (5 V/2.5 A), and the fourth preset power is 4.5 W (5 V/0.9 A). In a case where the third transmission mode is turned off, the fast transmission function of the fast transmission interface 22 in the four first transmission interfaces 2 is turned off, and the four first transmission interfaces 2 each transmit with the maximum transmission power as the fourth preset power. For example, the fourth preset power is 4.5 W (5 V/0.9 A).

It can be understood that the first transmission mode and the third transmission mode may be turned on simultaneously.

Figure 4A:
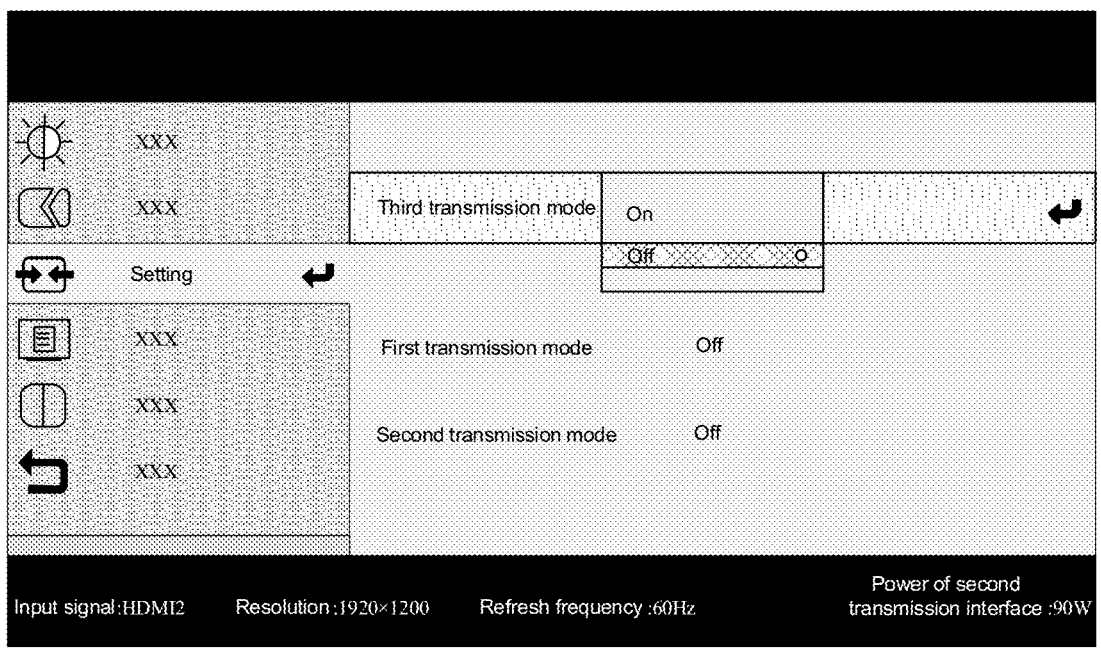
FIGS. 4A to 4C are schematic diagrams of on-screen display (OSD) interfaces, in accordance with some embodiments.
Figure 4B:
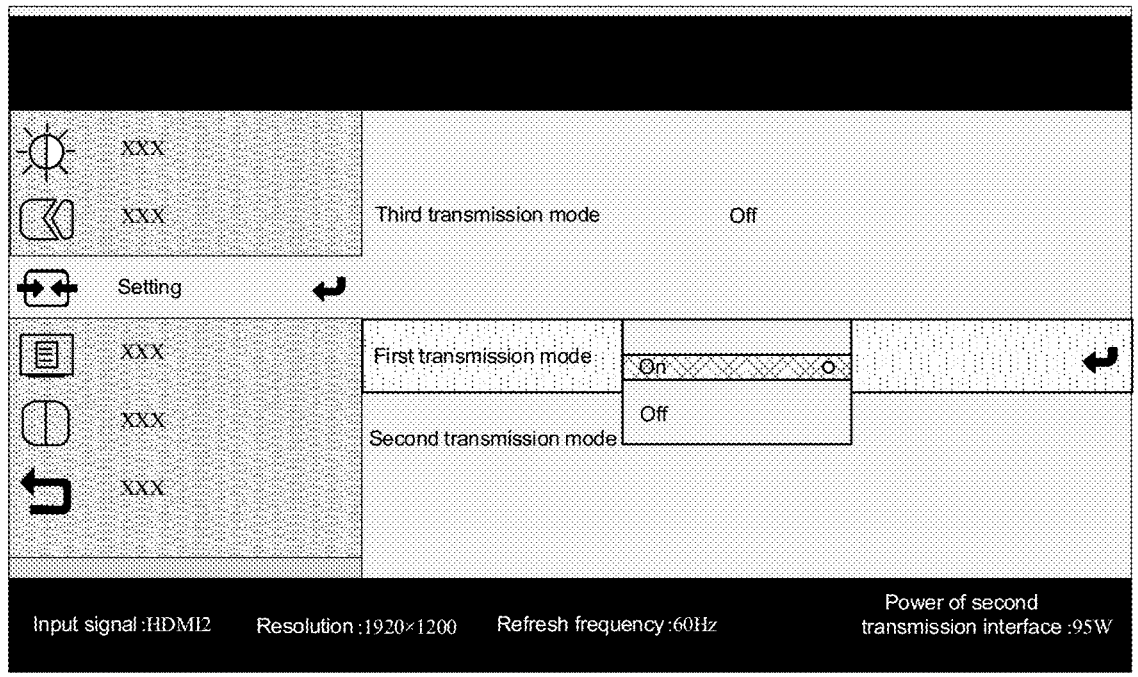
Figure 4C:
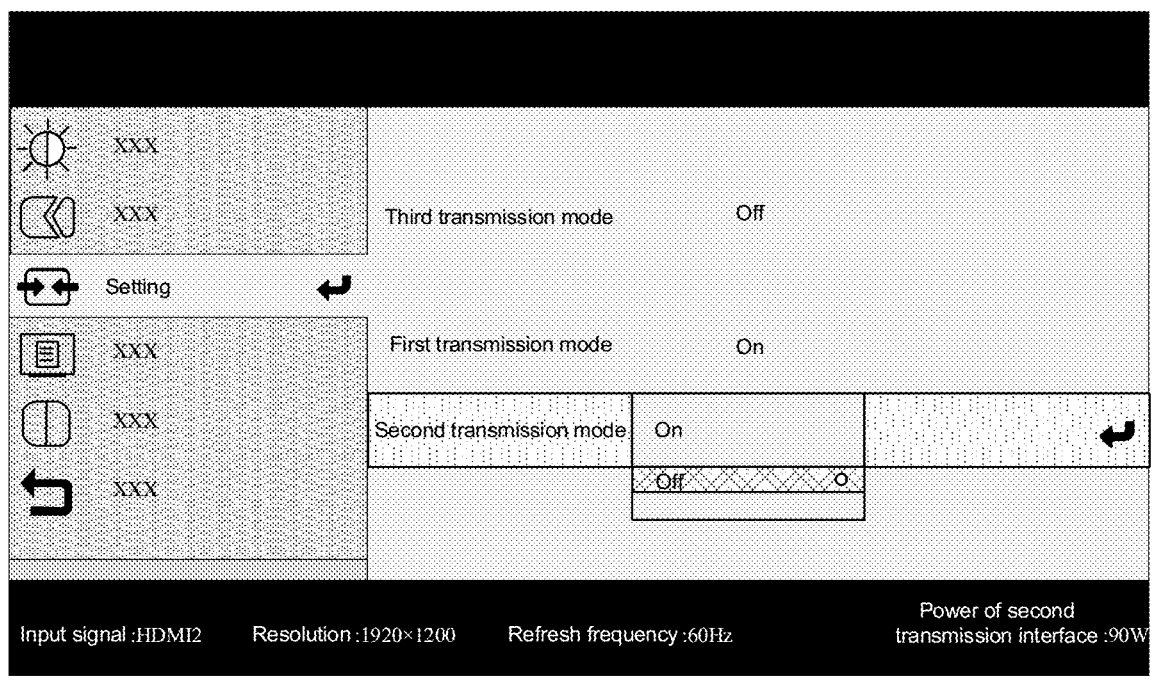

As shown in FIGS. 4A to 4C, the display device can display an on-screen display (OSD) interface 1-1, and the OSD interface 1-1 includes a first transmission mode option, a second transmission mode option and a third transmission mode option. There are an on button and an off button corresponding to each option, and a transmission mode may be turned on by clicking on a corresponding button. For example, as shown in FIG. 4B, an operation of turning on the first transmission mode is that a user clicks on the on button of the first transmission mode option; and the electrical signal transmission control chip 1 of the electrical signal transmission system 100 controls the first transmission interface 2 and the second transmission interface 3 to transmit in the first transmission mode in response to an instruction of turning on the first transmission mode. As shown in FIG. 4C, an operation of turning on the second transmission mode is that the user clicks on the on button of the second transmission mode option; and the electrical signal transmission control chip 1 controls the first transmission interface 2 and the second transmission interface 3 to transmit in the second transmission mode in response to an instruction of turning on the second transmission mode. As shown in FIG. 4A, an operation of turning on the third transmission mode is that the user clicks on the on button of the third transmission mode option; and the electrical signal transmission control chip 1 controls the first transmission interface 2 and the second transmission interface 3 to transmit in the third transmission mode in response to an instruction of turning on the third transmission mode.

In addition, as shown in FIGS. 4A to 4C, the OSD interface 1-1 further includes a display column of the transmission power of the second transmission interface 3. A value of the transmission power of the second transmission interface 3 is displayed in the display column. For example, as shown in FIG. 4A, the power value displayed in the display column of the transmission power of the second transmission interface 3 is 90 W.

The electrical signal transmission method provided in some embodiments of the present disclosure will be described below by taking an example where the electrical signal transmission system 100 includes four first transmission interfaces 2 and one second transmission interface 3, and the first transmission interfaces 2 are the type-A interfaces and the second transmission interface 3 is the type-C interface.

It will be noted that, in the electrical signal transmission method provided in the embodiments of the present disclosure, the first transmission interface 2 has a higher priority than the second transmission interface 3. That is, in a case where the total power of the system is certain, the first transmission interface 2 is preferentially ensured to transmit an electrical signal, and then the transmission power of the second transmission interface 3 is set according to a corresponding transmission mode.

Figure 6:
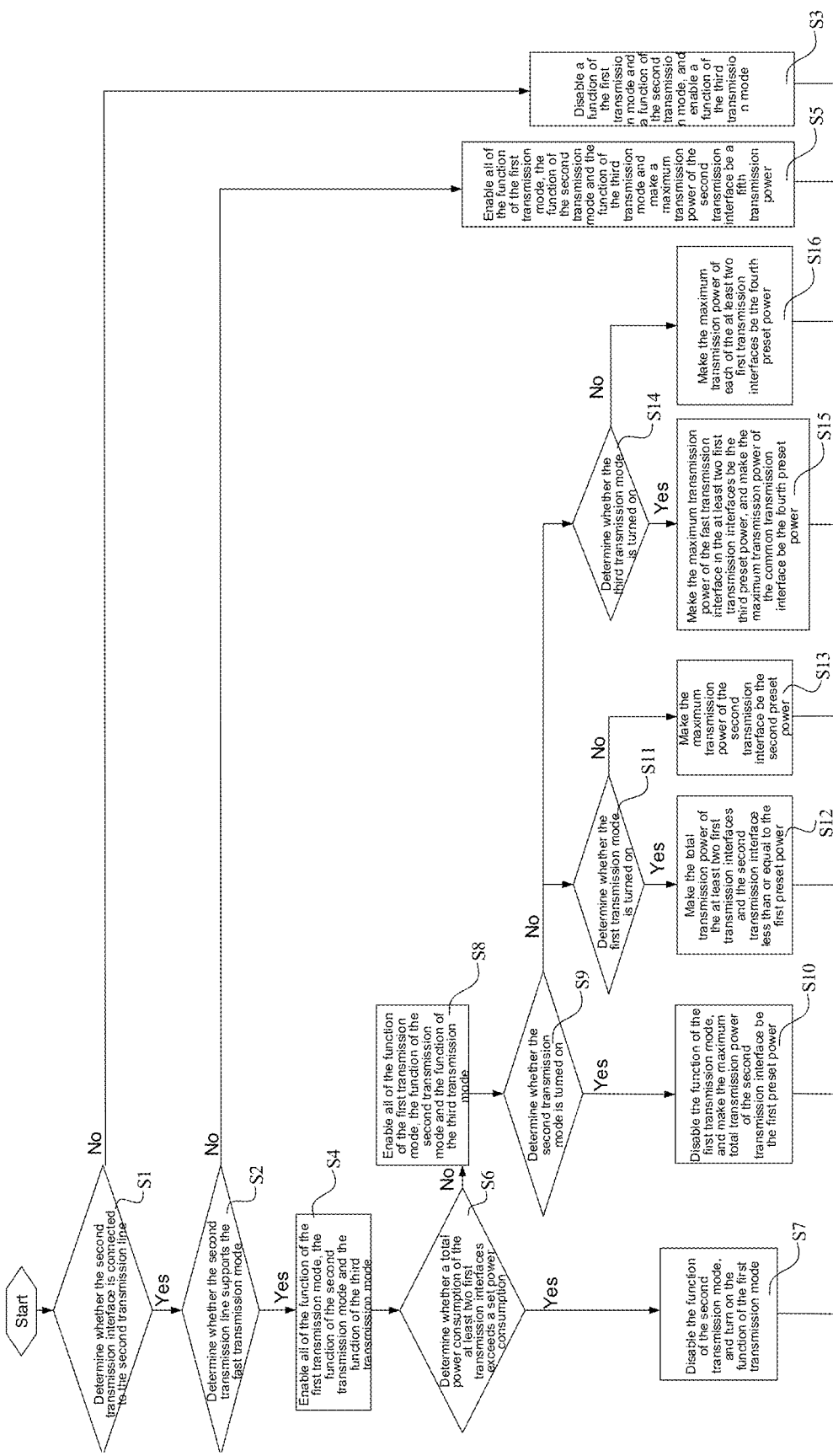
FIG. 6 is a flow diagram of a method for transmitting an electrical signal, in accordance with some embodiments.

As shown in FIG. 6, the method includes:
determining, in the case where the at least two first transmission interfaces 2 and the second transmission interface 3 are used, whether the second transmission mode is turned on; if the second transmission mode is turned on, disabling a function of the first transmission mode, and making the maximum transmission power of the second transmission interface be the first preset power in response to the instruction of turning on the second transmission mode; if the second transmission mode is not turned on, determining whether the first transmission mode is turned on;
if the first transmission mode is turned on, making the total transmission power of the at least two first transmission interfaces and the second transmission interface less than or equal to the first preset power in response to the instruction of turning on the first transmission mode; if the first transmission mode is not turned on, making the maximum transmission power of the second transmission interface be the second preset power.

For example, the second preset power is less than the first preset power.

For example, the first preset power is 100 W, and the second preset power is 74 W.

In some embodiments, making the total transmission power of the at least two first transmission interfaces 2 and the second transmission interface 3 less than or equal to the first preset power, includes:
reading a real-time total power of the at least two first transmission interfaces 2 in real time in a process where the at least two first transmission interfaces 2 transmit electrical signals, calculating a transmission power of the second transmission interface 3 according to the real-time total power and the first preset power, and controlling the second transmission interface 3 to transmit an electrical signal in real time according to the calculated transmission power of the second transmission interface 3.

For example, the real-time total power of the at least two first transmission interfaces 2 is read every two seconds during the transmission of the at least two first transmission interfaces 2. For example, a real-time power of each first transmission interface 2 is W1 during the transmission of the first transmission interface 2, and the first preset power is W2; and therefore, in a case where the number of the at least two first transmission interfaces 2 is n, the transmission power W3 of the second transmission interface 3 is $W3 = W2 - n \times W1$.

For example, the real-time total power of the at least two first transmission interfaces 2 that is read is 5 W during the transmission of the at least two first transmission interfaces 2. Therefore, the transmission power of the second transmission interface 3 is calculated to be 95 W according to the real-time total power and the first preset power (100 W), and the second transmission interface 3 is controlled to perform transmission in real time according to the calculated transmission power of the second transmission interface 3. In this case, as shown in FIG. 4B, the value displayed in the display column of the transmission power of the second transmission interface 3 is 95 W.

In a case where the external device connected to the second transmission interface 3 is the personal computer, while the electrical signal transmission system 100 transmits to the personal computer with the power of 95 W, the personal computer can also control the display device to which the electrical signal transmission system 100 is applied perform display.

In some embodiments, the transmission of electrical signals further include adopting the second transmission mode and the third transmission mode, the method is generally and exemplary described below.

As shown in FIG. 6, combined with FIGS. 2 and 4A to 4C, the transmission method includes following steps.

In S1, it is determined whether the second transmission interface 3 is connected to the second transmission line.

For example, a terminal of the second transmission line is connected to the personal computer, so that the second transmission interface 3 is coupled to the personal computer to charge the personal computer. In addition, the display device is controlled to perform display by the personal computer.

If a determination result of S1 is yes, S2 is performed, and if the determination result of S1 is no, S3 is performed.

In S2, it is determined whether the second transmission line supports the fast transmission mode.

For example, it is determined whether the connected second transmission line supports PD3.0, 5 A, and whether the connected second transmission line includes an electronically marked cable (E-marker) chip. A description that the second transmission line includes the E-marker chip means that the second transmission line is an active cable encapsulated with the E-marker chip therein. The second transmission line including the E-marker chip has strong power transmission and data transmission capabilities, so that the second transmission line is capable of supporting the fast transmission mode. For example, the second transmission line is capable of charging with a high power.

In S3, the function of the first transmission mode and a function of the second transmission mode are disabled, and a function of the third transmission mode is enabled.

Both the first transmission mode and the second transmission mode involve in using the second transmission interface 3. In a case where the second transmission interface 3 is not connected to the second transmission line, the second transmission interface 3 is not used. Thus, by disabling the function of the first transmission mode and the function of the second transmission mode, and enabling the function of the third transmission mode, the at least two first transmission interfaces 2 transmit in the third transmission mode.

Disabling the function of the first transmission mode and the function of the second transmission mode means that the system turns off the function of the first transmission mode and the function of the second transmission mode, and controls the at least two first transmission interfaces 2 and the second transmission interface 3 to be unable to transmit in the first transmission mode and the second transmission mode. On the OSD interface 1-1, the first transmission mode option and the second transmission mode option are grayed, and on buttons and off buttons corresponding to the first transmission mode option and the second transmission mode option cannot be selected. Thus, the user cannot turn on the first transmission mode and the second transmission mode. Enabling the function of the third transmission mode means that the system turns on the function of the third transmission mode, and controls the at least two first transmission interfaces 2 and the second transmission interface 3 to be able to transmit in the third transmission mode. On the OSD interface 1-1, the third transmission mode option can be selected, the user can turn on the third transmission mode by clicking on the corresponding on button. It will be noted that, turning on the function of the first transmission mode means that the first transmission mode can be selected by the user (in fact, whether the first transmission mode is turned on is unknown); and turning on the first transmission mode means that the system performs transmission in the first transmission mode.

If a determination result of S2 is yes, S4 and S6 are performed; and if the determination result of S2 is no, S5 is performed.

In S4, the function of the first transmission mode, the function of the second transmission mode and the function of the third transmission mode are all enabled.

In S6, it is determined whether a total power consumption of the at least two first transmission interfaces 2 exceeds a set power consumption.

A value of the set power consumption is low. For example, the set power consumption is 2 W. In a case where the at least two first transmission interfaces 2 are connected to external devices with a low energy consumption, such as the mouse and the keyboard, the total power consumption of the at least two first transmission interfaces 2 is low and does not exceed the set power consumption of 2 W.

In S5, the function of the first transmission mode, the function of the second transmission mode and the function of the third transmission mode are all enabled, and the maximum transmission power of the second transmission interface 3 is made to be a fifth transmission power.

The user can normally select the first transmission mode, the second transmission mode or the third transmission mode according to needs. Since the second transmission line does not support the fast transmission mode, in a case where the second transmission line is adopted, the maximum transmission power of the type-C interface has the upper limit. The fifth transmission power is less than the second preset power. For example, the fifth transmission power is 60 W (20 V/3 A).

If a determination result of S6 is yes, S7 is performed, and if the determination result of S6 is no, S8 and S9 are performed.

In S7, the function of the second transmission mode is disabled, and the function of the first transmission mode is turned on, and in response to the instruction of turning on the first transmission mode, the total transmission power of the at least two first transmission interfaces 2 and the second transmission interface 3 is made to be less than or equal to the first preset power.

If the total power consumption of the at least two first transmission interfaces 2 exceeds the set power consumption (for example, the total power consumption of the at least two first transmission interfaces 2 is 40 W), the second transmission interface 3 cannot perform transmission with the first preset power of 100 W as the maximum transmission power. Thus, the system automatically turns off the function of the second transmission mode, and turns on the function of the first transmission mode, so that the total transmission power of the at least two first transmission interfaces 2 and the second transmission interface 3 does not exceed the first preset power. If the total power consumption of the at least two first transmission interfaces 2 does not exceed the set power consumption (for example, the total power consumption of the at least two first transmission interfaces 2 is only 1 W), the total power consumption may be ignored. Thus, the second transmission interface 3 can perform transmission with the first preset power of 100 W as the maximum transmission power. That is, the function of the second transmission mode is enabled.

In S8, the functions of the first transmission mode, the second transmission mode and the third transmission mode are all enabled.

In S9, it is determined whether the second transmission mode is turned on. That is, it is determined whether the user clicks on the on button of the second transmission mode option, and whether the electrical signal transmission control chip 1 receives and responds to the instruction of turning on the second transmission mode.

If a determination result of S9 is yes, S10 is performed, and if the determination result of S9 is no, S11 or S14 is performed.

In S10, the function of the first transmission mode is disabled, and in response to the instruction of turning on the second transmission mode, the maximum transmission power of the second transmission interface 3 is made to be the first preset power.

Since the first transmission mode and the second transmission mode cannot be turned on simultaneously, the function of the first transmission mode is automatically turned off in the case where the second transmission mode is turned on. In the second transmission mode, the maximum transmission power of the second transmission interface 3 is the first preset power. That is, the second transmission interface 3 can perform transmission with the first preset power of 100 W as the maximum transmission power, so as to achieve efficient and fast transmission.

In S11, it is determined whether the first transmission mode is turned on. That is, it is determined whether the user clicks on the on button of the first transmission mode option, and whether the electrical signal transmission control chip 1 receives and responds to the instruction of turning on the first transmission mode.

If a determination result of S11 is yes, S12 is performed, and if the determination result of S11 is no, S13 is performed.

In S12, in response to the instruction of turning on the first transmission mode, the total transmission power of the at least two first transmission interfaces 2 and the second transmission interface 3 is less than or equal to the first preset power.

In this step, in the case where the at least two first transmission interfaces 2 and the second transmission interface 3 are used simultaneously, the system configures the transmission power of the second transmission interface 3 in real time according to the transmission power of the at least two first transmission interfaces 2, so that the first transmission interfaces 2 and the second transmission interface 3 each can perform transmission with an appropriate power.

In S13, the maximum transmission power of the second transmission interface 3 is made to be the second preset power.

It will be noted that, the maximum transmission power of the second transmission interface 3 is a maximum power that can be output by the second transmission interface 3 in a case where the second transmission interface 3 is used, but not an actual transmission power. The actual transmission power of the second transmission interface 3 may be less than the second preset power. The second preset power is obtained according to a maximum output power (e.g., 100 W) that can be provided by the system during transmission and the maximum total transmission power of the at least two first transmission interfaces during transmission. For example, the maximum total transmission power of the at least two first transmission interfaces during transmission is a total transmission power in a case where all the first transmission interfaces are used and the fast transmission function of the fast transmission interface 22 is turned on. In an example where the at least two first transmission interfaces are four type-A interfaces, a transmission power of each of three common transmission interfaces 21 is 4.5 W (5 V/0.9 A), the transmission power of the fast transmission interface 22 is 12.5 W (5V/2.5 A), and thus the maximum total transmission power of the four type-A interfaces is 26 W. Therefore, it may be obtained that the maximum transmission power of the second transmission interface 3 is 74 W. For example, the second preset power is 74 W.

In S14, it is determined whether the third transmission mode is turned on. That is, it is determined whether the user clicks on the on button of the third transmission mode option, and whether the electrical signal transmission control chip 1 receives and responds to the instruction of turning on the third transmission mode.

If a determination result of S14 is yes, S15 is performed, and if the determination result of S14 is no, S16 is performed.

In S15, in response to the instruction of turning on the third transmission mode, the maximum transmission power of the fast transmission interface 22 in the at least two first transmission interfaces 2 is made to be the third preset power, and the maximum transmission power of the common transmission interface 21 is made to be the fourth preset power. The third preset power is greater than the fourth preset power. For example, the third preset power is 12.5 W (5 V/2.5 A), and the fourth preset power is 4.5 W (5 V/0.9 A).

In S16, a maximum transmission power of each of the at least two first transmission interfaces 2 is made to be the fourth preset power.

In summary, in the electrical signal transmission method provided in the embodiments of the present disclosure, on a premise that the maximum output power of the system is not increased, by setting the three transmission modes, transmission powers of the transmission interfaces are reasonably configured. In this way, the maximum transmission power of the first transmission interface 2 and the maximum transmission power of the second transmission interface 3 are ensured in different situations, and thus the utilization rate of the power of the power supply of the system is improved. In addition, the user may selectively turn on a certain transmission mode on the OSD interface 1-1 of the display device, so that corresponding transmission interfaces each may perform transmission with the appropriate power according to requirements, which meets transmission requirements of the user for the first transmission interface 2 and the second transmission interface 3. Moreover, by using the electrical signal transmission method, a power consumption of the system will not be increased, thereby avoiding affecting the normal operation of electronic device caused by excessive power consumption and high temperature rise.

Figure 5:
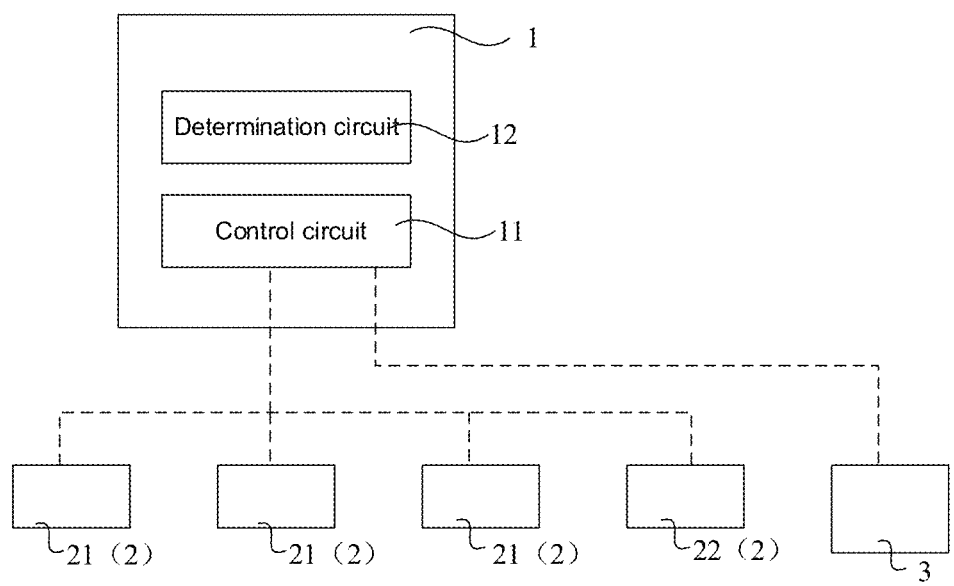
FIG. 5 is a structural diagram of an electrical signal transmission control chip, in accordance with some embodiments.

As shown in FIG. 5, some embodiments of the present disclosure provide an electrical signal transmission control chip 1. The electrical signal transmission control chip 1 is applied to the electrical signal transmission system 100, and the electrical signal transmission control chip 1 may implement the electrical signal transmission method described in the above embodiments.

In some embodiments, the electrical signal transmission control chip 1 includes a control circuit 11 and a determination circuit 12.

The determination circuit 12 is configured to determine whether the second transmission mode is turned on, and transmit a determination result to the control circuit 11.

The control circuit 11 is configured to: if the determination result is that the second transmission mode is turned on, disable the function of the first transmission mode and make a maximum transmission power of a second transmission interface 3 be the first preset power in response to the instruction of turning on the second transmission mode; if the determination result is that the second transmission mode is not turned on, feed back a determination result to the determination circuit 12.

The determination circuit 12 is further configured to: if the second transmission mode is not turned on, determine whether the first transmission mode is turned on, and transmit the determination result to the control circuit 11.

The control circuit 11 is further configured to: if the at least two first transmission interfaces 2 and the at least one second transmission interface 3 are used simultaneously, make the total transmission power of the at least two first transmission interfaces 2 and the second transmission interface(s) 3 less than or equal to the first preset power in response to the instruction of turning on the first transmission mode; if the determination result is that the second transmission mode is not turned on, make the maximum transmission power of the second transmission interface be the second preset power. The second preset power is less than the first preset power. For example, the first preset power is 100 W, and the second preset power is 74 W.

For example, the control circuit 11 is coupled to the at least two first transmission interfaces 2 and the at least one second transmission interface 3, so as to control the total transmission power of the at least two first transmission interfaces 2 and the at least one second transmission interface 3.

In some embodiments, the determination circuit 12 is further configured to, if the second transmission mode is not turned on, determine whether the third transmission mode is turned on while determining whether the first transmission mode is turned on, and transmit a determination result to the control circuit 11.

The control circuit 11 is further configured to: if the determination result is that the third transmission mode is turned on, in response to the instruction of turning on the third transmission mode, make a maximum transmission power of the fast transmission interface 22 in the at least two first transmission interfaces 2 be the third preset power, and make a maximum transmission power of the common transmission interface 21 be the fourth preset power; and if the determination result is that the third transmission mode is not turned on, make a maximum transmission power of each of the at least two first transmission interfaces 2 be the fourth preset power, the third preset power being greater than the fourth preset power. For example, the third preset power is 12.5 W (5 V/2.5 A), and the fourth preset power is 4.5 W (5 V/0.9 A).

In some embodiments, the determination circuit 12 is further configured to: determine whether the total power consumption of the at least two first transmission interfaces 2 exceeds the set power consumption before determining whether the second transmission mode is turned on; and transmit a determination result to the control circuit 11.

The control circuit 11 is further configured to: if the determination result is that the total power consumption of the at least two first transmission interfaces exceeds the set power consumption, disable the function of the second transmission mode, and turn on the function of the first transmission mode; and in response to the instruction of turning on the first transmission mode, make the total transmission power of the at least two first transmission interfaces 2 and the second transmission interface(s) 3 less than or equal to the first preset power; and if the determination result is that the total power consumption of the at least two first transmission interfaces does not exceed the set power consumption, feed back the determination result to the determination circuit 12.

In some other embodiments, the determination circuit 12 is further configured to: determine whether the second transmission interface 3 is connected to the second transmission line before determining whether the total power consumption of the at least two first transmission interfaces 2 exceeds the set power consumption.

The control circuit 11 is further configured to: if a determination result is that the second transmission interface is connected to the second transmission line, enable the function of the first transmission mode, the function of the second transmission mode and the function of the third transmission mode, and determine whether the total power consumption of the at least two first transmission interfaces 2 exceeds the set power consumption; and if the determination result is that the second transmission interface is not connected to the second transmission line, disable the function of the first transmission mode and the function of the second transmission mode, and enable the function of the third transmission mode.

The electrical signal transmission control chip 1 may implement steps of the electrical signal transmission method, and has beneficial effects consistent with the beneficial effects that may be achieved by the electrical signal transmission method, which will not be repeated here.

Some embodiments of the present disclosure provide an electrical signal transmission system 100. As shown in FIG. 3, in addition to the electrical signal transmission control chip 1, the at least two first transmission interfaces 2 and the at least one second transmission interface 3, the electrical signal transmission system 100 further includes a first power monitor 4, a second power monitor 5, a first power controller 6 and a second power controller 7.

The first power monitor 4 is coupled to the at least two first transmission interfaces 2, and is configured to monitor the real-time total transmission power of the at least two first transmission interfaces 2, and output a first monitoring result.

It will be noted that, the term "coupled" may mean that the first power monitor 4 and the at least two first transmission interfaces 2 are not in direct contact, but connection channel(s) exist between the first power monitor 4 and the at least two first transmission interfaces 2, so that communicative coupling is formed, and the first power monitor 4 and the at least two first transmission interfaces 2 cooperate or interact with each other. The term "coupled" used between two or more components mentioned below may also be explained as above.

The second power monitor 5 is coupled to the second transmission interface 3 and is configured to monitor the real-time transmission power of the second transmission interface 3 and output a second monitoring result.

In some embodiments, as shown in FIG. 3, the electrical signal transmission system 100 further includes a power interface 8, a first power distributor 9 and a second power distributor 10. The power interface 8 is configured to connect to an external power supply and transmit power to an inside of the electrical signal transmission system 100. The first power distributor 9 is coupled to the power interface 8 and the at least two first transmission interfaces 2, and is configured to distribute corresponding voltages and currents to the at least two first transmission interfaces 2 according to a received power. The second power distributor 10 is coupled to the power interface 8 and the at least one second transmission interface 3, and is configured to distribute a corresponding voltage and current to the at least one second transmission interface 3 according to a received power. For example, a first IIC channel exists between the first power distributor 9 and the at least two first transmission interfaces 2, and a second IIC channel exists between the second power distributor 10 and the at least one second transmission interface 3.

The first power monitor 4 is configured to monitor the voltages, currents and powers output from the first power distributor 9 to the at least two first transmission interfaces 2 in the first IIC channel, so as to monitor the real-time total transmission power of the at least two first transmission interfaces 2, and output the first monitoring result. The second power monitor 5 is configured to monitor the voltage, current and power output from the second power distributor 10 to the at least one second transmission interface 3 in the second IIC channel, so as to monitor the real-time total transmission power of the at least one second transmission interface 3, and output the second monitoring result.

As shown in FIG. 3, the first power controller 6 is coupled to the electrical signal transmission control chip 1, the first power monitor 4, the second power monitor 5 and the second transmission interface 3, and is configured to receive the first monitoring result and the second monitoring result, transmit the first monitoring result and the second monitoring result to the electrical signal transmission control chip 1, and control the transmission power of the second transmission interface 3 under control of the electrical signal transmission control chip 1.

For example, the first power monitor 4 transmits the first monitoring result to the first power controller 6, the second power monitor 5 transmits the second monitoring result to the first power controller 6, the first power controller 6 obtains the total transmission power (a value of the total power consumption) of the at least two first transmission interfaces 2, and the electrical signal transmission control chip 1 reads the value of the total power consumption and control the transmission power of the second transmission interface 3 in a case where the first transmission mode is turned on. The first power controller 6 controls the first transmission mode to be turned on or off.

The second power controller 7 is coupled to the electrical signal transmission control chip 1 and the at least two first transmission interfaces 2. The second power controller 7 is configured to control the transmission powers of the at least two first transmission interfaces 2 under the control of the electrical signal transmission control chip 1.

For the electrical signal transmission system provided in the embodiments of the present disclosure, by reasonably distributing the power of the power supply under the control of the electrical signal transmission control chip, it is possible to achieve flexible transmission of the first transmission interface and the second transmission interface. Therefore, the user may choose a corresponding transmission mode according to needs without increasing the total power consumption of the system. In this way, the utilization rate of the power of the power supply is improved, and the user's transmission requirements for the first transmission interface and the second transmission interface in different situations are satisfied.

Some embodiments of the present disclosure further provide a non-transitory computer-readable storage medium. The computer-readable storage medium stores therein computer program instructions that, when run on a processor, cause the processor to perform one or more steps of the electrical signal transmission method as described above.

For example, the computer-readable storage medium may include, but is not limited to: a magnetic storage device (e.g., a hard disk, a floppy disk or a magnetic tape), an optical disk (e.g., a compact disk (CD), a digital versatile disk (DVD)), a smart card or a flash memory device (e.g., an erasable programmable read-only memory (EPROM)), a card, a stick or a key driver). Various computer-readable storage media described in the embodiments of the present disclosure may refer to one or more devices and/or other machine-readable storage medium for storing information. The term "machine-readable storage media" may include, but are not limited to, wireless channels and various other media capable of storing, containing and/or carrying instructions and/or data.

Some embodiments of the present disclosure further provide a computer program product. The computer program product includes computer program instructions that, when executed on a computer, cause the computer to execute one or more steps of the electrical signal transmission method described above.

Some embodiments of the present disclosure further provide a computer program. When executed on a computer, the computer program causes the computer to perform one or more steps of the electrical signal transmission method described above.

The computer-readable storage medium, the computer program product and the computer program provided in the embodiments of the present disclosure have the same beneficial effects as the electrical signal transmission method as described in the above embodiments of the present disclosure, which will be not repeated here.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An electrical signal transmission method applied to an electrical signal transmission system, wherein the electrical signal transmission system includes at least two first transmission interfaces and at least one second transmission interface; electrical signal transmission modes of the electrical signal transmission system include a first transmission mode and a second transmission mode; the first transmission mode is used for controlling a total transmission power of the at least two first transmission interfaces and the at least one second transmission interface to be less than or equal to a first preset power; and the second transmission mode is used for controlling a maximum transmission power of a second transmission interface in the at least one second transmission interface to be the first preset power;

the electrical signal transmission method comprises:
determining whether the second transmission mode is turned on;
if the second transmission mode is turned on, disabling a function of the first transmission mode, and making the maximum transmission power of the second transmission interface be the first preset power in response to an instruction of turning on the second transmission mode; and
if the second transmission mode is not turned on, determining whether the first transmission mode is turned on;
if the first transmission mode is turned on, making the total transmission power of the at least two first transmission interfaces and the at least one second transmission interface less than or equal to the first preset power in response to an instruction of turning on the first transmission mode; and
if the first transmission mode is not turned on, making the maximum transmission power of the second transmission interface be a second preset power.

2. The electrical signal transmission method according to claim 1, wherein making the total transmission power of the at least two first transmission interfaces and the at least one second transmission interface less than or equal to the first preset power in response to the instruction of turning on the first transmission mode, includes:
reading a real-time total power of the at least two first transmission interfaces in real time in a process where the at least two first transmission interfaces transmit electrical signals;
calculating a transmission power of the at least one second transmission interface according to the real-time total power and the first preset power; and
controlling the at least one second transmission interface to transmit an electrical signal in real time according to the calculated transmission power of the at least one second transmission interface.

3. The electrical signal transmission method according to claim 2, wherein one first transmission interface in the at least two first transmission interfaces is a fast transmission interface, and at least one remaining first transmission interface in the at least two first transmission interfaces is at least one common transmission interface;
the electrical signal transmission modes of the electrical signal transmission system further include a third transmission mode, and the third transmission mode is used for controlling a fast transmission function of the fast transmission interface to be turned on;
the electrical signal transmission method further comprises:
if the second transmission mode is not turned on, determining whether the third transmission mode is turned on while determining whether the first transmission mode is turned on;
if the third transmission mode is turned on, in response to an instruction of turning on the third transmission mode, making a maximum transmission power of the fast transmission interface in the at least two first transmission interfaces be a third preset power, and making a maximum transmission power of a common transmission interface in the at least one common transmission interface be a fourth preset power; and if the third transmission mode is not turned on, making a maximum transmission power of each of the at least two first transmission interfaces be the fourth preset power;

wherein the third preset power is greater than the fourth preset power.

4. The electrical signal transmission method according to claim 1, wherein the second preset power is less than the first preset power.

5. The electrical signal transmission method according to claim 1, wherein one first transmission interface in the at least two first transmission interfaces is a fast transmission interface, and at least one remaining first transmission interface in the at least two first transmission interfaces is at least one common transmission interface;

the electrical signal transmission modes of the electrical signal transmission system further include a third transmission mode, and the third transmission mode is used for controlling a fast transmission function of the fast transmission interface to be turned on;

the electrical signal transmission method further comprises:

if the second transmission mode is not turned on, determining whether the third transmission mode is turned on while determining whether the first transmission mode is turned on;

if the third transmission mode is turned on, in response to an instruction of turning on the third transmission mode, making a maximum transmission power of the fast transmission interface in the at least two first transmission interfaces be a third preset power, and making a maximum transmission power of a common transmission interface in the at least one common transmission interface be a fourth preset power; and if the third transmission mode is not turned on, making a maximum transmission power of each of the at least two first transmission interfaces be the fourth preset power;

wherein the third preset power is greater than the fourth preset power.

6. The electrical signal transmission method according to claim 5, further comprising:

determining whether a total power consumption of the at least two first transmission interfaces exceeds a set power consumption before determining whether the second transmission mode is turned on;

if the total power consumption of the at least two first transmission interfaces exceeds the set power consumption, disabling a function of the second transmission mode, and turning on the function of the first transmission mode; and in response to the instruction of turning on the first transmission mode, making the total transmission power of the at least two first transmission interfaces and the at least one second transmission interface less than or equal to the first preset power; and if the total power consumption of the at least two first transmission interfaces does not exceed the set power consumption, determining whether the second transmission mode is turned on.

7. The electrical signal transmission method according to claim 6, further comprising:

determining whether the second transmission interface is connected to a second transmission line before determining whether the total power consumption of the at least two first transmission interfaces exceeds the set power consumption;

if the second transmission interface is connected to the second transmission line, enabling the function of the first transmission mode, the function of the second transmission mode and a function of the third transmission mode, and determining whether the total power consumption of the at least two first transmission interfaces exceeds the set power consumption; and if the second transmission interface is not connected to the second transmission line, disabling the function of the first transmission mode and the function of the second transmission mode, and enabling the function of the third transmission mode.

8. The electrical signal transmission method according to claim 7, further comprising:

if the second transmission interface is connected to the second transmission line, determining whether the second transmission line supports a fast transmission mode;

if the second transmission line supports the fast transmission mode, enabling the function of the first transmission mode, the function of the second transmission mode and the function of the third transmission mode, and determining whether the total power consumption of the at least two first transmission interfaces exceeds the set power consumption; and if the second transmission line does not support the fast transmission mode, enabling the function of the first transmission mode, the function of the second transmission mode and the function of the third transmission mode, and making the maximum transmission power of the second transmission interface be a fifth transmission power;

wherein the fifth transmission power is less than the second preset power.

9. A non-transitory computer-readable storage medium storing computer program instructions that, when run on a processor, cause the processor to perform one or more steps of the electrical signal transmission method according to claim 1.

10. A non-transitory computer program product including computer program instructions that, when executed on a computer, cause the computer to perform one or more steps of the electrical signal transmission method according to claim 1.

11. An electrical signal transmission control chip applied to an electrical signal transmission system, wherein the electrical signal transmission system includes at least two first transmission interfaces and at least one second transmission interface; electrical signal transmission modes of the electrical signal transmission system include a first transmission mode and a second transmission mode; the first transmission mode is used for controlling a total transmission power of the at least two first transmission interfaces and the at least one second transmission interface to be less than or equal to a first preset power; and the second transmission mode is used for controlling a maximum transmission power of a second transmission interface in the at least one second transmission interface to be the first preset power;

the electrical signal transmission control chip comprises a control circuit and a determination circuit, wherein the determination circuit is configured to determine whether the second transmission mode is turned on, and transmit a determination result to the control circuit;

the control circuit is configured to: if the determination result is that the second transmission mode is turned on, disable a function of the first transmission mode and make the maximum transmission power of the second transmission interface be the first preset power in response to an instruction of turning on the second transmission mode; if the determination result is that the second transmission mode is not turned on, feed back the determination result to the determination circuit;

the determination circuit is further configured to: if the second transmission mode is not turned on, determine whether the first transmission mode is turned on, and transmit another determination result to the control circuit;

the control circuit is further configured to: if the determination result is that the first transmission mode is turned on, make the total transmission power of the at least two first transmission interfaces and the at least one second transmission interface less than or equal to the first preset power in response to an instruction of turning on the first transmission mode; if the determination result is that the first transmission mode is not turned on, make the maximum transmission power of the second transmission interface be a second preset power;

the second preset power is less than the first preset power.

12. The electrical signal transmission control chip according to claim 11, wherein one first transmission interface in the at least two first transmission interfaces is a fast transmission interface, and at least one remaining first transmission interface in the at least two first transmission interfaces is at least one common transmission interface;

the electrical signal transmission modes of the electrical signal transmission system further include a third transmission mode, and the third transmission mode is used for controlling a fast transmission function of the fast transmission interface to be turned on;

the determination circuit is further configured to, if the second transmission mode is not turned on, determine whether the third transmission mode is turned on while determining whether the first transmission mode is turned on, and transmit yet another determination result to the control circuit;

the control circuit is further configured to: if the determination result is that the third transmission mode is turned on, in response to an instruction of turning on the third transmission mode, make a maximum transmission power of the fast transmission interface in the at least two first transmission interfaces be a third preset power, and make a maximum transmission power of a common transmission interface in the at least one common transmission interface be a fourth preset power; and if the determination result is that the third transmission mode is not turned on, make a maximum transmission power of each of the at least two first transmission interfaces be the fourth preset power;

wherein the third preset power is greater than the fourth preset power.

13. The electrical signal transmission control chip according to claim 12, wherein the determination circuit is further configured to determine whether a total power consumption of the at least two first transmission interfaces exceeds a set power consumption before determining whether the second transmission mode is turned on, and transmit yet another determination result to the control circuit;

the control circuit is further configured to: if the determination result is that the total power consumption of the at least two first transmission interfaces exceeds the set power consumption, disable a function of the second transmission mode, and turn on the function of the first transmission mode; and in response to the instruction of turning on the first transmission mode, make the total transmission power of the at least two first transmission interfaces and the at least one second transmission interface less than or equal to the first preset power; and if the determination result is that the total power consumption of the at least two first transmission interfaces does not exceed the set power consumption, feed back the determination result to the determination circuit.

14. The electrical signal transmission control chip according to claim 13, wherein the determination circuit is further configured to: determine whether the second transmission interface is connected to a second transmission line before determining whether the total power consumption of the at least two first transmission interfaces exceeds the set power consumption;

the control circuit is further configured to: if the determination result is that the second transmission interface is connected to the second transmission line, enable the function of the first transmission mode, the function of the second transmission mode and a function of the third transmission mode, and determine whether the total power consumption of the at least two first transmission interfaces exceeds the set power consumption; and if the determination result is that the second transmission interface is not connected to the second transmission line, disable the function of the first transmission mode and the function of the second transmission mode, and enable the function of the third transmission mode.

15. An electrical signal transmission system, comprising:
the electrical signal transmission control chip according to claim 8;
at least two first transmission interfaces coupled to the electrical signal transmission control chip, and configured to be coupled to first transmission lines to perform electrical signal transmission; and
at least one second transmission interface coupled to the electrical signal transmission control chip, and configured to be coupled to at least one second transmission line to perform electrical signal transmission, wherein
the at least two first transmission interfaces and the at least one second transmission interface each transmit an electrical signal with a preset power under control of the electrical signal transmission control chip.

16. The electrical signal transmission system according to claim 15, further comprising:
a first power monitor coupled to the at least two first transmission interfaces, wherein the first power monitor is configured to monitor a real-time total transmission power of the at least two first transmission interfaces, and output a first monitoring result;
a second power monitor coupled to the second transmission interface, wherein the second power monitor is configured to monitor a real-time transmission power of the second transmission interface, and output a second monitoring result; and a first power controller coupled to the electrical signal transmission control chip, the first power monitor, the second power monitor and the second transmission interface, wherein the first power controller is configured to receive the first monitoring result and the second monitoring result, transmit the first monitoring result and the second monitoring result to the electrical signal transmission control chip, and control a transmission power of the second transmission interface under control of the electrical signal transmission control chip.

17. The electrical signal transmission system according to claim 16, further comprising:
   a second power controller coupled to the electrical signal transmission control chip and the at least two first transmission interfaces, wherein the second power controller is configured to control transmission powers of the at least two first transmission interfaces under the control of the electrical signal transmission control chip.

18. The electrical signal transmission system according to claim 15, further comprising:
   a power interface configured to connect to an external power supply and transmit power to an inside of the electrical signal transmission system;
   a first power distributor coupled to the power interface and the at least two first transmission interfaces, wherein the first power distributor is configured to distribute corresponding voltages and currents to the at least two first transmission interfaces according to a received power; and
   a second power distributor coupled to the power interface and the at least one second transmission interface, wherein the second power distributor is configured to distribute a corresponding voltage and current to the at least one second transmission interface according to another received power.

* * * * *

UNITED STATES PATENT AND TRADEMARK OFFICE
CERTIFICATE OF CORRECTION

PATENT NO. : 12,210,472 B2
APPLICATION NO. : 17/908380
DATED : January 28, 2025
INVENTOR(S) : Hao Wei et al.

Page 1 of 1

It is certified that error appears in the above-identified patent and that said Letters Patent is hereby corrected as shown below:

In the Claims

Column 24, Lines 41-43, Claim 15, "15. An electrical signal transmission system, comprising: the electrical signal transmission control chip according to claim 8" should be --15. An electrical signal transmission system, comprising: the electrical signal transmission control chip according to claim 11--.

Signed and Sealed this
Twelfth Day of August, 2025

Coke Morgan Stewart
*Acting Director of the United States Patent and Trademark Office*